United States Patent
Chi

(10) Patent No.: US 7,368,899 B2
(45) Date of Patent: May 6, 2008

(54) CONFIGURATION AND CONTROLLING METHOD OF BOOST CIRCUIT HAVING PULSE-WIDTH MODULATION LIMITING CONTROLLER

(75) Inventor: Tse-Hua Chi, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/448,194

(22) Filed: Jun. 6, 2006

(65) Prior Publication Data

US 2007/0018626 A1    Jan. 25, 2007

(30) Foreign Application Priority Data

Jul. 20, 2005   (TW) .............................. 94124610 A

(51) Int. Cl.
G05F 1/613 (2006.01)
G05F 1/46 (2006.01)

(52) U.S. Cl. ...................................... 323/285; 323/901

(58) Field of Classification Search .............. 363/222, 363/223, 282, 284, 285, 351
See application file for complete search history.

(56) References Cited

U.S. PATENT DOCUMENTS 6,657,417 B1 * 12/2003 Hwang ........................ 323/222
6,781,352 B2 *  8/2004 Athari et al. ............... 323/222

* cited by examiner

Primary Examiner—Gary L. Laxton
(74) Attorney, Agent, or Firm—Volpe and Koenig, P.C.

(57) ABSTRACT

The proposed boost circuit includes a DC/DC converter having a switch, receiving an input voltage and outputting an input voltage feedback signal, an output voltage feedback signal, an input current feedback signal and an output voltage after a boost of the input voltage, and a feedback control circuit having a pulse-width modulation limiting controller, coupled to the converter, receiving the input voltage feedback signal, the output voltage feedback signal and the input current feedback signal and generating an output signal with a fixed time period. The output signal is employed to control the switching of the switch so as to generate the boost.

14 Claims, 6 Drawing Sheets

CONFIGURATION AND CONTROLLING METHOD OF BOOST CIRCUIT HAVING PULSE-WIDTH MODULATION LIMITING CONTROLLER

FIELD OF THE INVENTION

The present invention relates to a boost circuit and its controlling method. More specifically, this invention relates to a boost circuit with a pulse-width modulation limiting controller (PWMLC) and the controlling method thereof.

BACKGROUND OF THE INVENTION

Please refer to FIG. 1, which is the schematic circuit diagram of a conventional boost circuit 1 in the prior art. In FIG. 1, the boost circuit includes a DC/DC boost converter 11 and a feedback control circuit 12. The feedback control circuit 12 further includes a voltage/current detector 121 for receiving an input voltage feedback signal $S_{Vi}$, an output voltage feedback signal $S_{Vo}$ and an input current feedback signal $S_{Ii}$ generated by the DC/DC boost converter 11, an oscillator 122, a modulator 123, a soft-starting unit 124 and a feedback controller 125. In which, an input voltage $V_{in}$ turns into an output voltage $V_o$ after a boost, and the output voltage $V_o$ is controlled by an output signal K of the feedback controller 125. As shown in FIG. 2, the variations of the output voltage $V_o$ of the boost circuit 1 is increasing from an initial value S to a peak value P gradually and then decreasing to a stable value Vo slowly. The operational principles of the boost circuit 1 are described as follows. The voltage/current detector 121 coverts the detected signal into a voltage signal and outputs the voltage signal to the modulator 123 firstly. The modulator 123 modulates the time period of a pulse train according to the voltage signal and a first output signal generated by the oscillator 122 secondly. The modulated pulse train is outputted from the modulator 123 to the feedback controller 125 and compared with the first output signal generated by the oscillator 122 and a second output signal generated by the soft starting unit 124 thirdly. And the output signal K is generated and outputted by the feedback controller 125 to control the switching of a switch Q1 of the boost circuit 1 so as to generate the boost lastly.

According to the waveform of the output voltage $V_o$ as shown in FIG. 2, the value of the output voltage $V_o$ is rising from an initial value S to a peak value P and then decreasing from P to a stable value Vo. Since the conventional boost circuit 1 will make the output voltage $V_o$ rise to the highest value of P, relatively the electronic elements of the boost circuit 1 such as the switch Q1, the diode D and the output capacitor C1 must have the higher withstand voltage and the higher reliability, and the manufacturing costs of these electronic elements are higher. The power consumption of the conventional boost circuit 1 is relatively higher and more expensive since the output voltage $V_o$ will raise to the peak value P, which is higher than the rated voltage Vo.

Keeping the drawbacks of the prior arts in mind, and employing experiments and research full-heartily and persistently, the applicant finally conceived the configuration and the controlling method of a boost circuit having a pulse-width modulation limiting controller.

SUMMARY OF THE INVENTION

It is therefore an object of the present invention to propose a boost circuit having a PWMLC and the controlling method thereof to avoid the output voltage of the boost circuit from raising to a peak value, which is higher than the rated voltage, so as to lower down the power consumptions and the total manufacturing costs of the boost circuit.

According to the first aspect of the present invention, the boost circuit includes a DC/DC converter having a switch, receiving an input voltage and outputting an input voltage feedback signal, an output voltage feedback signal, an input current feedback signal and an output voltage after a boost of the input voltage, and a feedback control circuit having a PWMLC, coupled to the converter, receiving the input voltage feedback signal, the output voltage feedback signal and the input current feedback signal and generating an output signal with a fixed time period through a control of the PWMLC for controlling a turn on and a turn off of the switch so as to generate the boost.

Preferably, the output signal is a pulse train, and the pulse train has a first pulse amplitude while the output voltage is increasing from an initial value to a stable value and a second pulse amplitude after the output voltage reaches the stable value.

Preferably, the second pulse amplitude is larger than the first pulse amplitude.

Preferably, the control circuit further includes a voltage/current detector coupled to the converter and the PWMLC, receiving the input voltage feedback signal, the output voltage feedback signal and the input current feedback signal and generating a voltage output signal, an oscillator generating a saw-tooth wave, a modulator coupled to the voltage/current detector, the PWMLC and the oscillator, receiving the voltage output signal and the saw-tooth wave and generating a modulated signal, a soft starting unit coupled to the PWMLC and generating a soft starting control signal, and a feedback controller coupled to the oscillator, the modulator and the soft starting unit, receiving the saw-tooth wave, the modulated signal and the soft starting control signal and generating the output signal.

Preferably, the PWMLC outputs a first, a second and a third control signals to the voltage/current detector, the modulator and the soft starting unit respectively so as to control at least one of the voltage/current detector, the modulator and the soft starting unit for generating the output signal.

Preferably, the first control signal is a first voltage clamping signal for outputting a first voltage with a first fixed value from the voltage/current detector, the second control signal is a period limited signal for allowing the modulated signal to have a fixed period, and the third control signal is a second voltage clamping signal for outputting a second voltage with a second fixed value from the soft starting unit.

Preferably, the PWMLC further includes a circuit starter starting the PWMLC and outputting a starting signal, a first voltage clamper coupled to the circuit starter and the voltage/current detector, receiving the starting signal and outputting the first control signal, a time period limiter coupled to the first voltage clamper and the modulator, receiving the starting signal and outputting the second control signal, and a second voltage clamper coupled to the time period limiter and the soft starting unit, receiving the starting signal and outputting the third control signal.

Preferably, the modulator is a pulse-width modulator.
Preferably, the feedback controller is a NAND gate.
Preferably, the converter is one of a DC/DC boost converter and a DC/DC buck-boost converter.
Preferably, the feedback control circuit has an output terminal and the switch is a MOSFET having a gate coupled to the output terminal of the feedback control circuit.

According to the second aspect of the present invention, the method for controlling a boost circuit, in which the boost circuit includes a DC/DC converter having a switch and a feedback control circuit having a PWMLC, a voltage/current detector, an oscillator, a modulator, a soft starting unit and a feedback controller, includes the steps of: (a) transmitting an input voltage feedback signal, an output voltage feedback signal and an input current feedback signal from the converter to the voltage/current detector; (b) transmitting a first, a second and a third control signals generated by the PWMLC to the voltage/current detector, the modulator and the soft starting unit respectively so as to control at least one of the voltage/current detector, the modulator and the soft starting unit; (c) transmitting a voltage output signal generated by the voltage/current detector to the modulator; (d) transmitting a saw-tooth wave generated by the oscillator to the modulator and the feedback controller; (e) transmitting a modulated signal generated by the modulator and a soft starting control signal generated by the soft starting unit to the feedback controller; (f) transmitting an output signal having a fixed period generated by the feedback controller to the converter; and (g) controlling a turn on and a turn off of the switch through the output signal to increase an output voltage from an initial value to a stable value so as to generate a boost.

Preferably, the first control signal is a first voltage clamping signal for outputting a first voltage with a first fixed value from the voltage/current detector, the second control signal is a period limited signal for allowing the modulated signal to have a fixed period, and the third control signal is a second voltage clamping signal for outputting a second voltage with a second fixed value from the soft starting unit.

Preferably, the method for controlling a boost circuit further includes the steps of: (h) starting the PWMLC and outputting a starting signal; (i) receiving the starting signal and outputting the first control signal; (j) receiving the starting signal and outputting the second control signal; and (k) receiving the starting signal and outputting the third control signal.

Preferably, the output signal is a pulse train, and the pulse train has a first pulse amplitude while the output voltage is increasing from a initial value to a stable value and a second pulse amplitude after the output voltage reaches the stable value.

Preferably, the second pulse amplitude is larger than the first pulse amplitude.

The present invention may best be understood through the following descriptions with reference to the accompanying drawings, in which:

DETAILED DESCRIPTION OF THE PREFERRED EMBODIMENT

Figure 1:
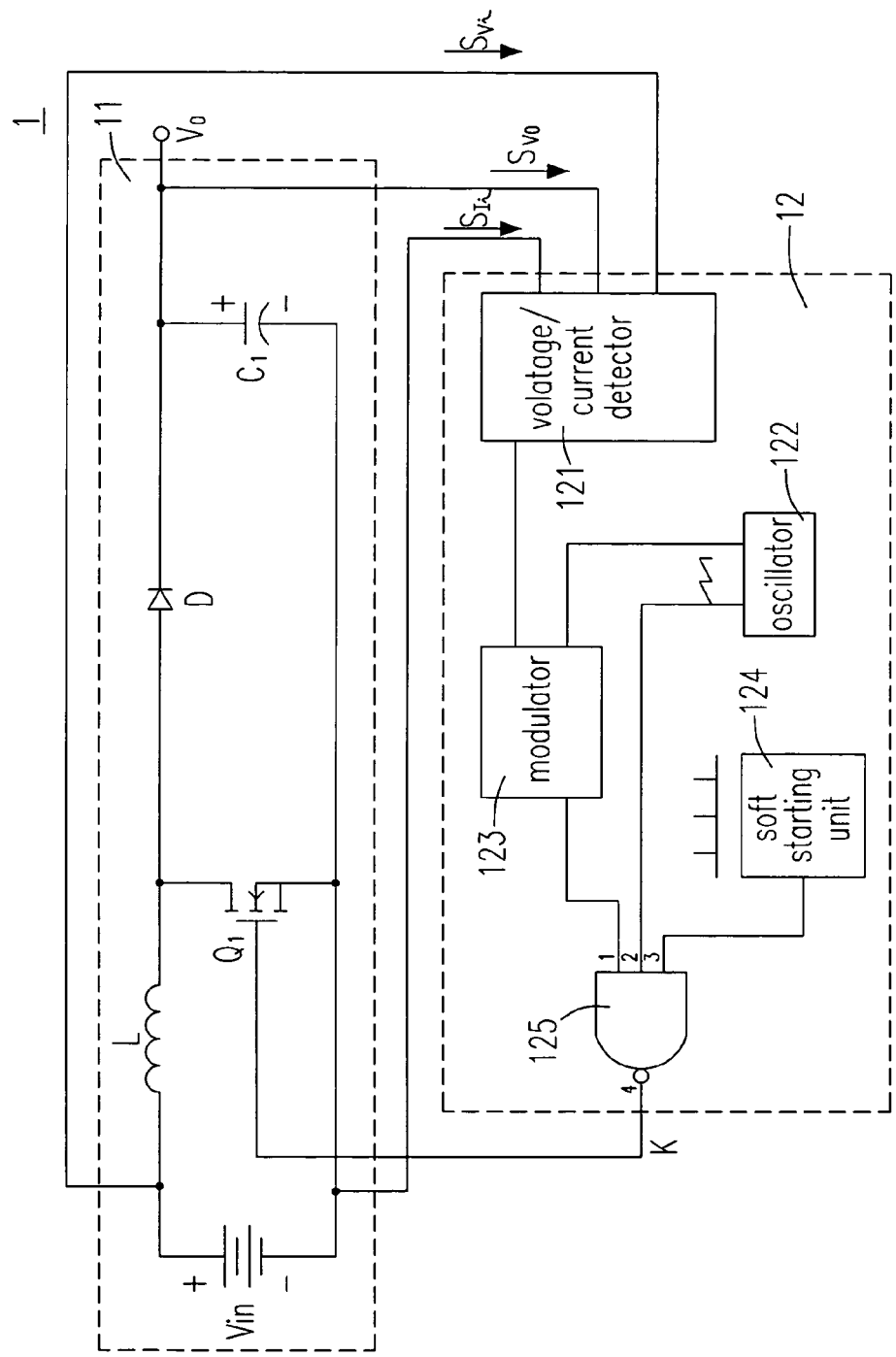
FIG. 1 is the schematic circuit diagram of a conventional boost circuit in the prior art.
Figure 2:
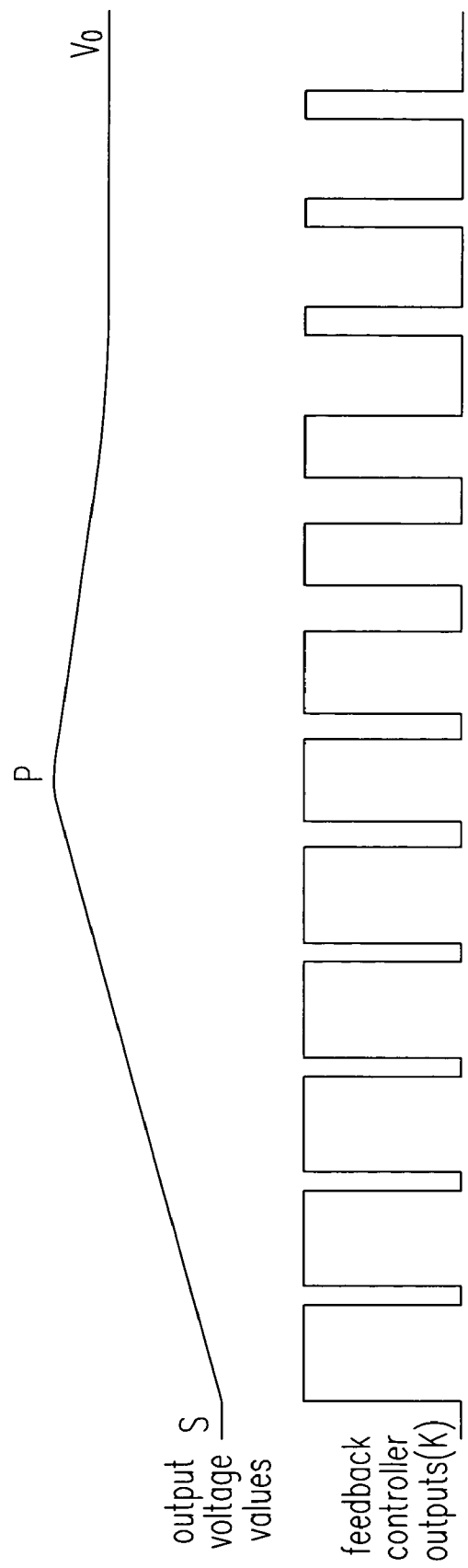
FIG. 2 shows the waveforms of the output voltage $V_o$ and the corresponding output signal K of the feedback controller versus time of the conventional boost circuit of FIG. 1 respectively, in which the output voltage $V_o$ is increasing from an initial value S to a peak value P and then decreasing to a stable value Vo.
Figure 3A:
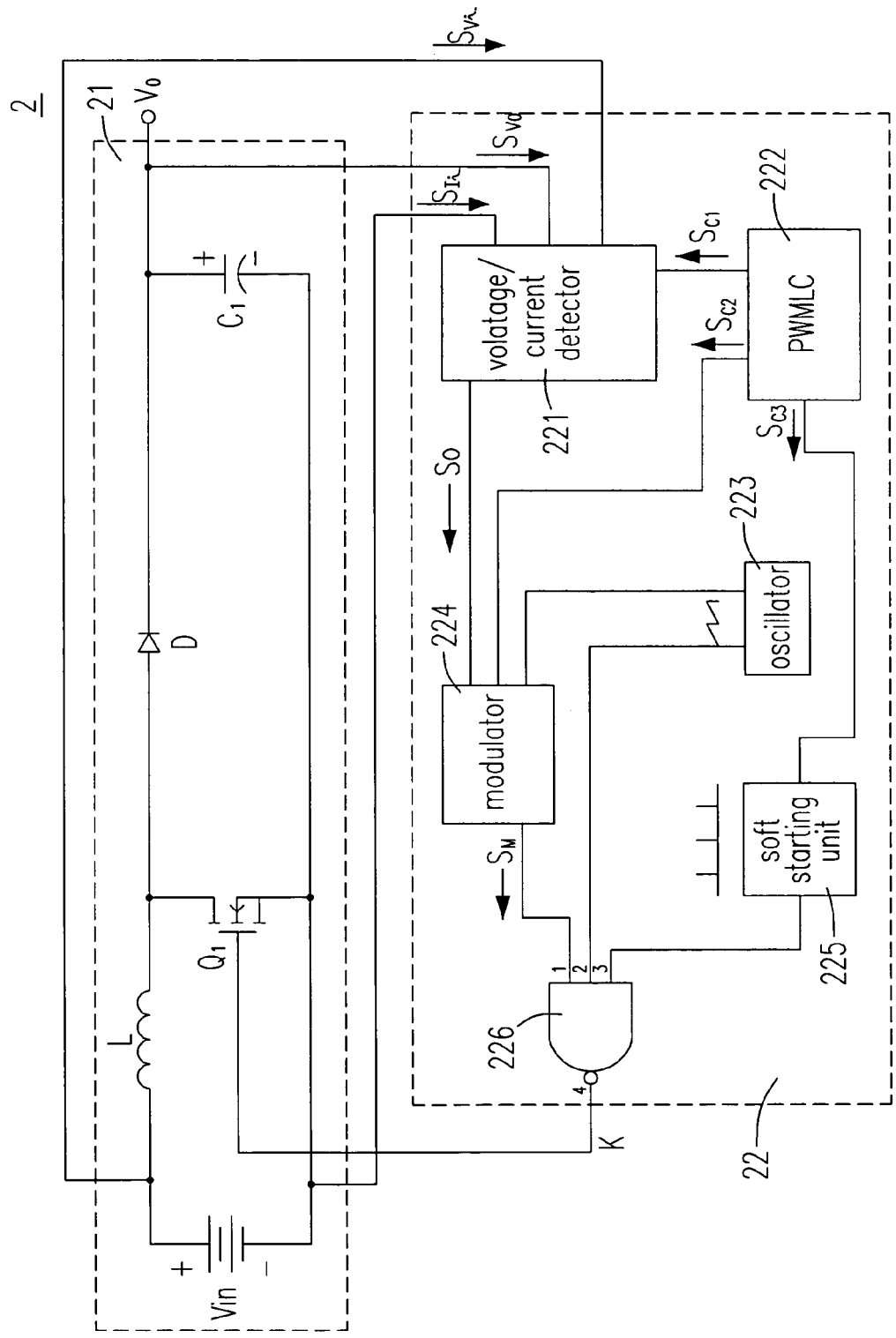
FIG. 3(a) is the schematic circuit diagram of the first preferred embodiment of the boost circuit having a PWMLC and a boost converter of the present invention.
Figure 4:
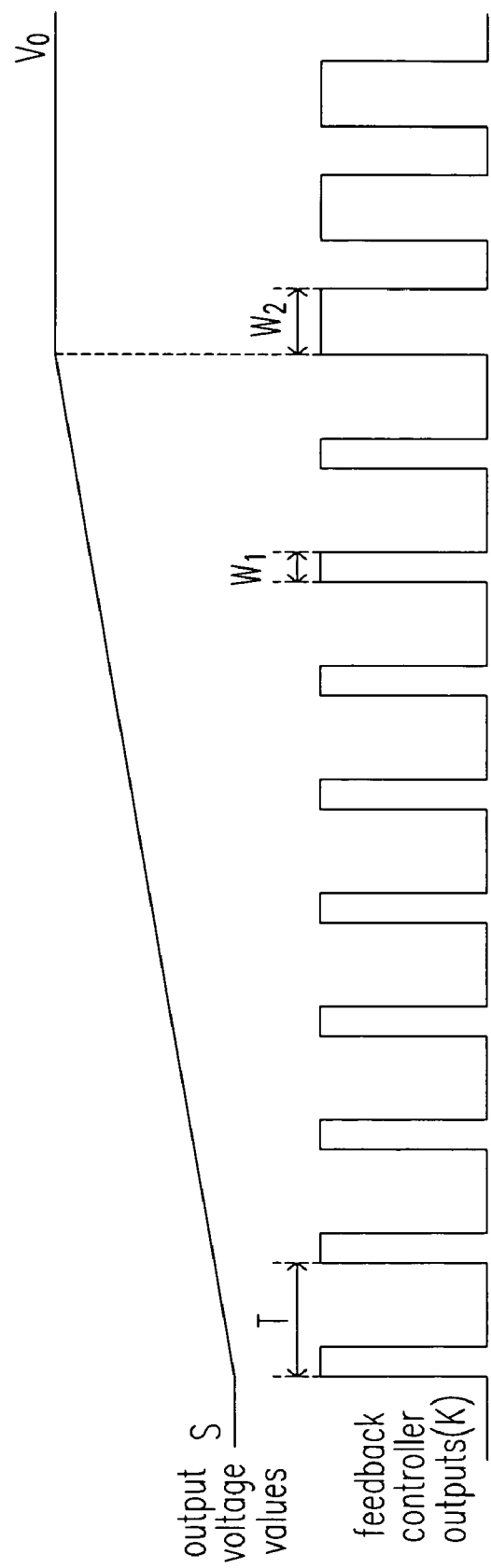
FIG. 4 shows the waveforms of the output voltage $V_o$ and the corresponding output signal K of the feedback controller versus time of the first preferred embodiment of the proposed boost circuit of FIG. 3(a) respectively, in which the output voltage $V_o$ is increasing from an initial value S to a stable value Vo.

Please refer to FIG. 3(a), it shows the schematic circuit diagram of the first preferred embodiment of the boost circuit 2 of the present invention. In which, the boost circuit 2 includes a DC/DC boost converter 21 for receiving an input voltage $V_{in}$ and outputting an output voltage $V_o$ after a boost of the input voltage $V_{in}$ and a feedback control circuit 22. The feedback control circuit 22 further includes a voltage/current detector 221, a PWMLC 222, an oscillator 223, a modulator 224, a soft starting unit 225 and a feedback controller 226. The feedback control circuit 22 is coupled to the DC/DC boost converter 21 for receiving an input voltage feedback signal $S_{Vi}$, an output voltage feedback signal $S_{Vo}$ and an input current feedback signal $S_{Ii}$ generated by the DC/DC boost converter 21 and generating an output signal K with a fixed period T (as shown in FIG. 4) through a control of the PWMLC 222. In which, the PWMLC 222 respectively outputs a first control signal $S_{C1}$, a second control signal $S_{C2}$ and a third control signal $S_{C3}$ to the voltage/current detector 221, the modulator 224 and the soft starting unit 225 to control at least one of the voltage/current detector 221, the modulator 224 and the soft starting unit 225 so as to generate the output signal K. The switching of a switch Q1, which could be a MOSFET, of the DC/DC boost converter 21 is controlled by the output signal K so as to generate the boost of the input voltage $V_{in}$. Besides, the voltage/current detector 221 is coupled to the DC/DC boost converter 21 and the PWMLC 222 for receiving the input voltage feedback signal $S_{Vi}$, the output voltage feedback signal $S_{Vo}$ and the input current feedback signal S11 and generating a voltage output signal $S_O$, and the oscillator 223 is employed to generate a saw-tooth wave. The modulator 224 is coupled to the voltage/current detector 221, the PWMLC 222 and the oscillator 223 for generating a modulated signal $S_M$. The soft starting unit 225 is coupled to the PWMLC 222 and generates a soft starting control signal, which is a pulse train. The feedback controller 226 is coupled to the oscillator 223, the modulator 224 and the soft starting unit 225 for generating the output signal K. Furthermore, the feedback controller 226 is a NAND, the modulator 224 is a pulse-width modulator, and the output signal K is a pulse train preferably. During the time period that the output voltage $V_o$ is raising from the initial value S to the stable value Vo, the pulse train of the output signal K has the first pulse amplitude W1. After the output voltage $V_o$ reaches the stable value Vo, the boost circuit 2 is under a normal operation, and the pulse train of the output signal K has the second pulse amplitude W2. The second pulse amplitude W2 is larger than the first pulse amplitude W1 due to a load of the boost circuit 2. The aforementioned first control signal $S_{C1}$ is a first voltage clamping signal and employed to make the voltage/current detector 221 output a first voltage having a first fixed value, the aforementioned second control signal $S_{C2}$ is a period limiting signal and employed to make modulated signal SM generated by the modulator 224 have a fixed period, and the aforementioned third control signal $S_{C3}$ is a second voltage clamping signal and employed to make the soft starting unit 225 output a second voltage having a second fixed value.

Figure 3B:
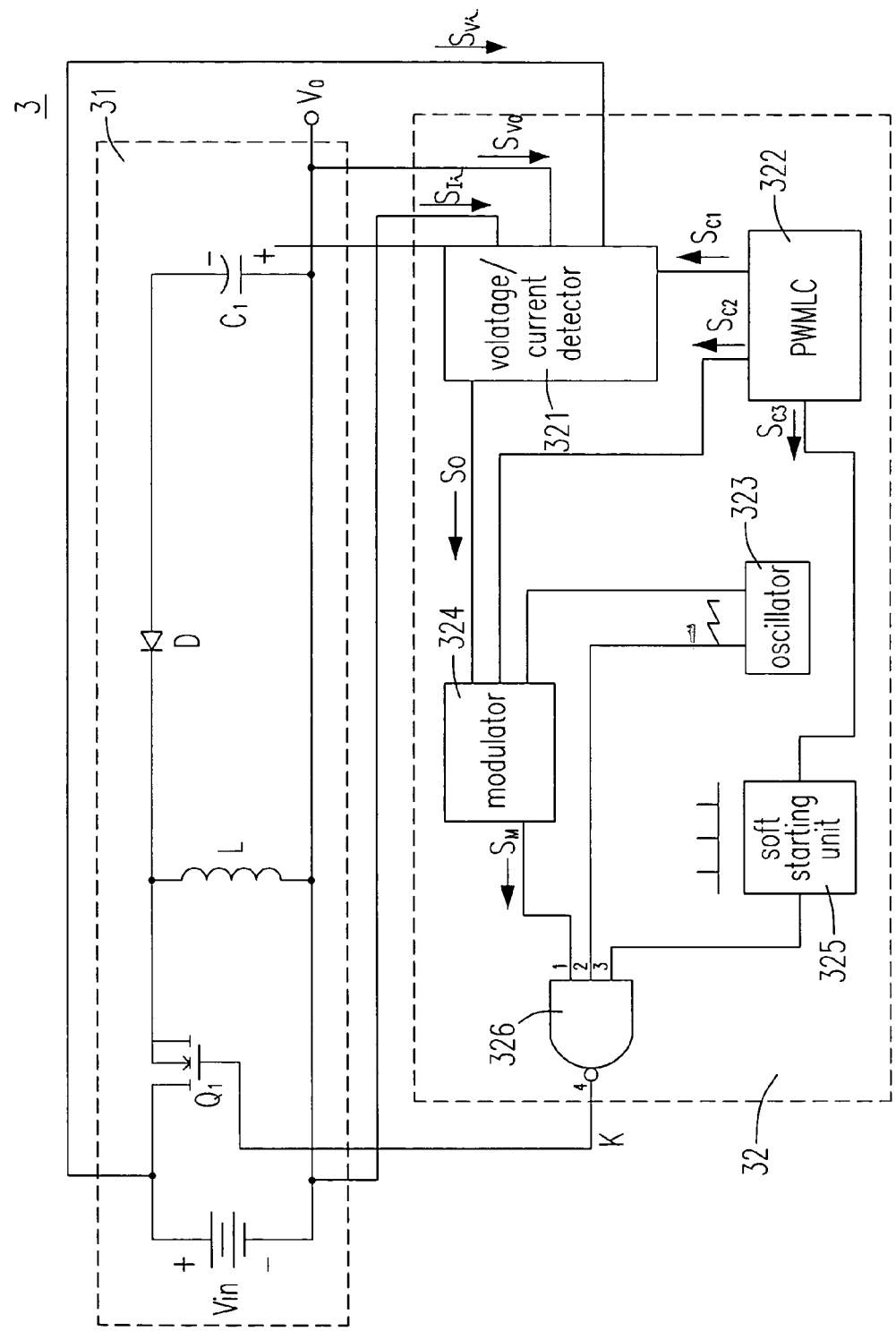
FIG. 3(b) is the schematic circuit diagram of the second preferred embodiment of the boost circuit having a PWMLC and a buck-boost converter of the present invention.

FIG. 3(b) is the schematic circuit diagram of the second preferred embodiment of the boost circuit 3 of the present invention. In which, the boost circuit 3 includes a DC/DC buck-boost converter 31 for receiving an input voltage $V_{in}$ and outputting an output voltage $V_o$ after a boost of the input voltage $V_{in}$ and a feedback control circuit 32. The feedback control circuit 32 further includes a voltage/current detector 321, a PWMLC 322, an oscillator 323, a modulator 324, a soft starting unit 325 and a feedback controller 326. The feedback control circuit 32 is coupled to the DC/DC buck-boost converter 31 for receiving an input voltage feedback signal $S_{Vi}$, an output voltage feedback signal $S_{Vo}$ and an input current feedback signal $S_{Ii}$ generated by the DC/DC buck-boost converter 31 and generating an output signal K with a fixed period T (as shown in FIG. 4) through a control of the PWMLC 322. In which, the switching of a switch Q1 of the DC/DC buck-boost converter 31 is controlled by the output signal K so as to generate the boost of the input voltage $V_{in}$. The differences between the second preferred embodiment of the boost circuit 3 of the present invention and the first preferred embodiment of the boost circuit 2 of the present invention are that the second preferred embodiment of the boost circuit 3 of the present invention includes a DC/DC buck-boost converter 31, and the first preferred embodiment of the boost circuit 2 of the present invention includes a DC/DC boost converter 21, both of the first and the second preferred embodiments of the boost circuit 2/3 of the present invention could boost the input voltage $V_{in}$ and output an output voltage $V_o$, and the rest of the operational principles and the configurations of the first and the second preferred embodiments of the present invention 2/3 are exactly the same.

Figure 5:
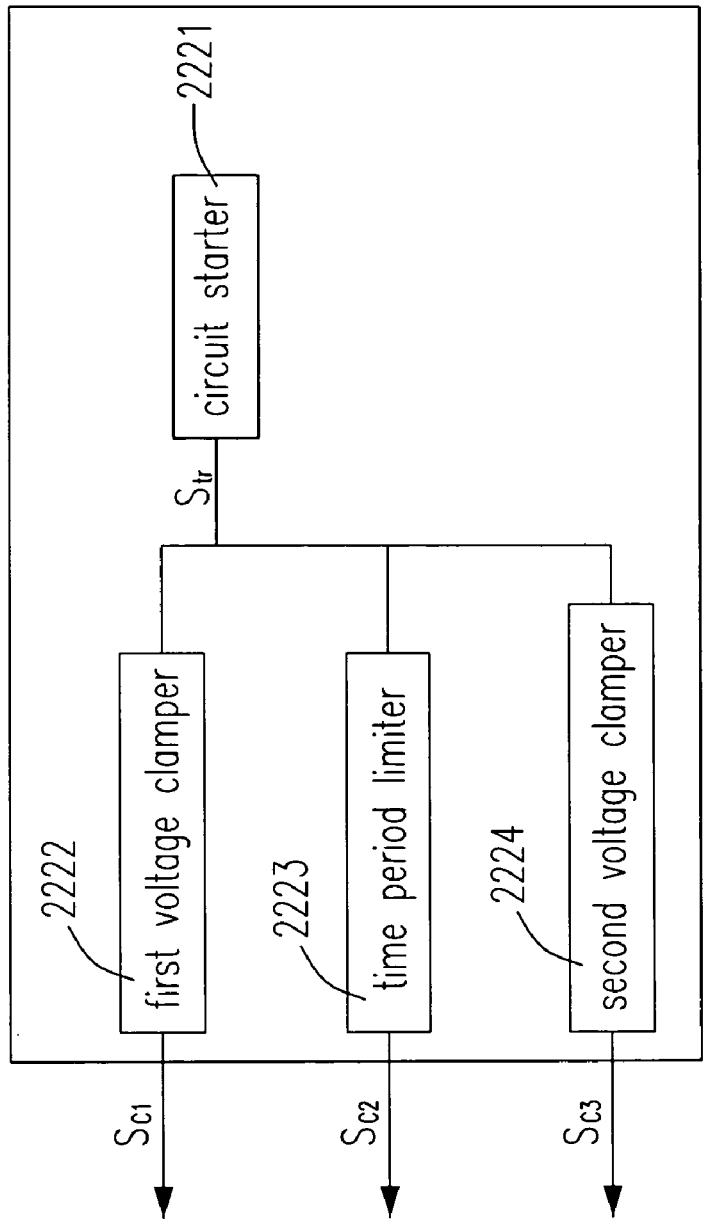
FIG. 5 shows the block diagram of the PWMLC of the present invention.

Since both of the first and the second preferred embodiments of the boost circuit 2/3 of the present invention have the PWMLC 222/322 as above-mentioned (see FIGS. 3(a) and 3(b) respectively), the PWMLC 222 of the first preferred embodiment of the boost circuit 2 is employed as an example and elaborated as follows. Please refer to FIG. 5, which is the block diagram of the PWMLC 222 of the first preferred embodiment of the boost circuit 2 of the present invention. In which, the PWMLC 222 includes a circuit starter 2221 for starting the PWMLC 222 and outputting a starting signal Str, a first voltage clamper 2222 coupled to the circuit starter 2221 and the voltage/current detector 221 for receiving the starting signal Str and outputting the first control signal $S_{C1}$, a time period limiter 2223 coupled to the first voltage clamper 2222 and the modulator 224 for receiving the starting signal Str and outputting the second control signal $S_{C2}$, and a second voltage clamper 2224 coupled to the time period limiter 2223 and the soft starting unit 225 for receiving the starting signal Str and outputting the third control signal $S_{C3}$. The first and the second preferred embodiments of the boost circuit 2/3 of the present invention commonly share the same operational principles (see FIGS. 3(a) and 3(b)), and the controlling method of the boost circuit 2 of the first preferred embodiment of the present invention is further elaborated as an example as follows. The proposed method for controlling a boost circuit, in which the boost circuit 2 includes a DC/DC converter 21 having a switch Q1 and a feedback control circuit 22 having a PWMLC 222, a voltage/current detector 221, an oscillator 223, a modulator 224, a soft starting unit 225 and a feedback controller 226, includes the steps of: (a) transmitting an input voltage feedback signal $S_{Vi}$, an output voltage feedback signal $S_{Vo}$ and an input current feedback signal $S_{Ii}$ from the DC/DC boost converter 21 to the voltage/current detector 221; (b) transmitting a first, a second and a third control signals $S_{C1}$, $S_{C2}$ and $S_{C1}$ generated by the PWMLC 222 to the voltage/current detector 221, the modulator 224 and the soft starting unit 225 respectively so as to control at least one of the voltage/current detector 221, the modulator 224 and the soft starting unit 225; (c) transmitting a voltage output signal $S_O$ generated by the voltage/current detector 221 to the modulator 224; (d) transmitting a saw-tooth wave generated by the oscillator 223 to the modulator 224 and the feedback controller 226; (e) transmitting a modulated signal $S_M$ generated by the modulator 224 and a soft starting control signal generated by the soft starting unit to the feedback controller 226; (f) transmitting an output signal K having a fixed period T generated by the feedback controller 226 to the DC/DC converter 21; and (g) controlling a turn on and a turn off of the switch Q1 through the output signal K to increase an output voltage $V_o$ from an initial value S to a stable value Vo so as to generate a boost.

According to the aforementioned descriptions, the proposed boost circuit having a PWMLC and the controlling method thereof are provided to avoid the output voltage $V_o$ of the boost circuit from raising to a peak value P, which is higher than the rated voltage Vo, so as to lower down the power consumptions and the total manufacturing costs of the boost circuit.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:
1. A boost circuit, comprising:
   a DC/DC converter having a switch, receiving an input voltage and outputting an input voltage feedback signal, an output voltage feedback signal, an input current feedback signal and an output voltage after a boost of said input voltage; and
   a feedback control circuit coupled to said converter and comprising:
   a pulse-width modulation limiting controller (PWMLC) outputting a first, a second and a third control signals;
   a voltage/current detector coupled to said converter and said PWMLC, receiving said input voltage feedback signal, said output voltage feedback signal, said first control signal and said input current feedback signal, and generating a voltage output signal;
   a modulator coupled to said voltage/current detector and said PWMLC, receiving said voltage output signal and said second control signal and generating a modulated signal;
   an oscillator generating and outputting a saw-tooth wave to said modulator;
   a soft starting unit receiving said third control signal and generating a soft starting control signal; and
   a feedback controller coupled to said oscillator, said modulator and said soft starting unit, receiving said saw-tooth wave, said modulated signal and said soft starting control signal and generating an output signal;

wherein said feedback controller generates said output signal with a fixed time period through a control of said PWMLC to control at least one of said voltage/current detector, said modulator and said soft starting unit for controlling a turn on and a turn off of said switch so as to generate said boost.

2. The circuit according to claim 1, wherein said output signal is a pulse train, and said pulse train has a first pulse amplitude while said output voltage is increasing from an initial value to a stable value and a second pulse amplitude after said output voltage reaches said stable value.

3. The circuit according to claim 2, wherein said second pulse amplitude is larger than said first pulse amplitude.

4. The circuit according to claim 1, wherein said first control signal is a first voltage clamping signal for outputting a first voltage with a first fixed value from said voltage/current detector, said second control signal is a period limited signal for allowing said modulated signal to have a fixed period, and said third control signal is a second voltage clamping signal for outputting a second voltage with a second fixed value from said soft starting unit.

5. The circuit according to claim 1, wherein said PWMLC further comprises:
 a circuit starter starting said PWMLC and outputting a starting signal;
 a first voltage clamper coupled to said circuit starter and said voltage/current detector, receiving said starting signal and outputting said first control signal;
 a time period limiter coupled to said first voltage clamper and said modulator, receiving said starting signal and outputting said second control signal; and
 a second voltage clamper coupled to said time period limiter and said soft starting unit, receiving said starting signal and outputting said third control signal.

6. The circuit according to claim 1, wherein said modulator is a pulse-width modulator.

7. The circuit according to claim 1, wherein said feedback controller is a NAND gate.

8. The circuit according to claim 1, wherein said converter is one of a DC/DC boost converter and a DC/DC buck-boost converter.

9. The circuit according to claim 1, wherein said feedback control circuit has an output terminal and said switch is a MOSFET having a gate coupled to said output terminal of said feedback control circuit.

10. A method for controlling a boost circuit, wherein said boost circuit comprises a DC/DC converter having a switch and a feedback control circuit having a pulse-width modulation limiting controller (PWMLC), a voltage/current detector, an oscillator, a modulator, a soft starting unit and a feedback controller, comprising the steps of:
 (a) transmitting an input voltage feedback signal, an output voltage feedback signal and an input current feedback signal from said converter to said voltage/current detector;
 (b) transmitting a first, a second and a third control signals generated by said PWMLC to said voltage/current detector, said modulator and said soft starting unit respectively so as to control at least one of said voltage/current detector, said modulator and said soft starting unit;
 (c) transmitting a voltage output signal generated by said voltage/current detector to said modulator;
 (d) transmitting a saw-tooth wave generated by said oscillator to said modulator and said feedback controller;
 (e) transmitting a modulated signal generated by said modulator and a soft starting control signal generated by said soft starting unit to said feedback controller;
 (f) transmitting an output signal having a fixed period generated by said feedback controller to said converter; and
 (g) controlling a turn on and a turn off of said switch through said output signal to increase an output voltage from an initial value to a stable value so as to generate a boost.

11. The method according to claim 10, wherein said first control signal is a first voltage clamping signal for outputting a first voltage with a first fixed value from said voltage/current detector, said second control signal is a period limited signal for allowing said modulated signal to have a fixed period, and said third control signal is a second voltage clamping signal for outputting a second voltage with a second fixed value from said soft starting unit.

12. The method according to claim 10, further comprising the steps of:
 (h) starting said PWMLC and outputting a starting signal;
 (i) receiving said starting signal and outputting said first control signal;
 (j) receiving said starting signal and outputting said second control signal; and
 (k) receiving said starting signal and outputting said third control signal.

13. The method according to claim 10, wherein said output signal is a pulse train, and said pulse train has a first pulse amplitude while said output voltage is increasing from a initial value to a stable value and a second pulse amplitude after said output voltage reaches said stable value.

14. The method according to claim 13, wherein said second pulse amplitude is larger than said first pulse amplitude.

* * * * *